United States Patent
Ham

(10) Patent No.: US 12,447,433 B1
(45) Date of Patent: Oct. 21, 2025

(54) AUTOMATIC HVAC FILTER CHANGE SYSTEM

(71) Applicant: Drew Nielson Ham, Winnemucca, NV (US)

(72) Inventor: Drew Nielson Ham, Winnemucca, NV (US)

( * ) Notice: Subject to any disclaimer, the term of this patent is extended or adjusted under 35 U.S.C. 154(b) by 0 days.

(21) Appl. No.: 19/029,873

(22) Filed: Jan. 17, 2025

Related U.S. Application Data

(60) Provisional application No. 63/622,573, filed on Jan. 19, 2024.

(51) Int. Cl.
  *B01D 46/18* (2006.01)
  *B01D 46/00* (2022.01)
  *B01D 46/42* (2006.01)
  *B01D 46/46* (2006.01)
  *F24F 13/28* (2006.01)

(52) U.S. Cl.
  CPC ....... *B01D 46/185* (2013.01); *B01D 46/0002* (2013.01); *B01D 46/0086* (2013.01); *B01D 46/4227* (2013.01); *B01D 46/46* (2013.01); *F24F 13/28* (2013.01); *B01D 2279/50* (2013.01)

(58) Field of Classification Search
  None
  See application file for complete search history.

(56) References Cited

U.S. PATENT DOCUMENTS

| | | | | |
|---|---|---|---|---|
| 2,335,144 | A * | 11/1943 | Dahlman | B01D 46/20 55/354 |
| 3,834,131 | A * | 9/1974 | Neumann | B01D 46/20 55/501 |
| 4,221,576 | A * | 9/1980 | Phillips, Jr. | B01D 46/46 55/352 |
| 4,394,146 | A * | 7/1983 | Klein | B01D 39/14 55/354 |
| 4,894,071 | A * | 1/1990 | Klein | F24F 8/10 55/354 |
| 5,599,363 | A * | 2/1997 | Percy | B01D 46/20 55/354 |
| 6,632,269 | B1 * | 10/2003 | Najm | B01D 46/20 55/501 |
| 2002/0069763 | A1 * | 6/2002 | Najm | B01D 46/0086 96/429 |
| 2005/0097869 | A1 * | 5/2005 | Yu | B01D 46/22 55/354 |
| 2007/0234688 | A1 * | 10/2007 | Cheng | B01D 46/22 55/354 |
| 2008/0276806 | A1 * | 11/2008 | Cheng | B01D 46/62 96/414 |

(Continued)

FOREIGN PATENT DOCUMENTS

| | | | | |
|---|---|---|---|---|
| CN | 108905434 | A * | 11/2016 | B01D 46/0065 |
| DE | 102007001316 | A1 * | 7/2008 | B01D 46/20 |

(Continued)

*Primary Examiner* — Brit E. Anbacht
(74) *Attorney, Agent, or Firm* — Plager Schack LLP; Mark H. Plager; Stephen Hallberg

(57) ABSTRACT

An automatic HVAC filter change system is disclosed herein. The automatic HVAC filter change system changes filters automatically by way of a design configured to seamlessly move and change filters while on an automated schedule. The automatic HVAC filter change system provides notification and reminders for when it is done.

10 Claims, 19 Drawing Sheets

(56) References Cited

U.S. PATENT DOCUMENTS

| | | | |
|---|---|---|---|
| 2009/0031684 A1* | 2/2009 | Ragona | B01D 46/185 55/383 |
| 2011/0061537 A1* | 3/2011 | Sullivan | B01D 46/16 96/429 |
| 2014/0373719 A1* | 12/2014 | Spiegel | B01D 46/0038 55/354 |
| 2020/0338491 A1* | 10/2020 | Yamamoto | B01D 46/442 |
| 2022/0410056 A1* | 12/2022 | Kelley | B01D 46/10 |

FOREIGN PATENT DOCUMENTS

| | | | | |
|---|---|---|---|---|
| DE | 102020203610 | A1 * | 10/2020 | B01D 46/0086 |
| EP | 1870151 | A1 * | 12/2007 | B01D 46/22 |
| KR | 20050046872 | A * | 5/2005 | B01D 39/1623 |
| KR | 20070012298 | A * | 1/2007 | B01D 46/20 |
| KR | 1742738 | B1 * | 6/2017 | B01D 46/22 |
| WO | WO-9623668 | A1 * | 8/1996 | B01D 46/20 |
| WO | WO-2021095000 | A2 * | 5/2021 | B01D 46/0093 |

\* cited by examiner

AUTOMATIC HVAC FILTER CHANGE SYSTEM

CLAIM OF BENEFIT TO PRIOR APPLICATION

This application claims benefit to U.S. Provisional Patent Application 63/622,573, entitled "AUTOMATIC HVAC FILTER CHANGE SYSTEM," filed Jan. 19, 2024. The U.S. Provisional Patent Application 63/622,573 is incorporated herein by reference.

BACKGROUND

Embodiments of the invention described in this specification relate generally to HVAC systems, and more particularly, to an automatic HVAC filter change system.

People normally change filters of the HVAC system manually. Those people need to change dirty HVAC home or office filters manually over a longer period of time, so they must either schedule the changes or pay attention to the condition of the current filter. As such, manual filter changes require more labor and travel for a simple task which, if it were automated, would be able to provide cleaner air more consistently without all the work and remembering when the change the filter.

Therefore, what is needed is a way to automate the changing of filters for HVAC systems.

BRIEF DESCRIPTION

A novel automatic HVAC filter change system is disclosed. In some embodiments, the automatic HVAC filter change system changes filters automatically by way of a design configured to seamless move and change filters on an automated schedule. In some embodiments, the automatic HVAC filter change system provides notification and reminders for when done.

In some embodiments, the automatic HVAC filter change system comprises (i) a frame, (ii) a motor assembly and plate that connects to the frame in a first corner, (iii) a plurality of auxiliary filter media roller end cap plates, (iv) a grille, (v) a passive roller tube around which clean filter media is wound for automated changing, (vi) a motor roller tube that rotates by operation of the motor assembly and pulls the clean filter media along the grille, (vii) a plurality of passive clean side spring hub connected to the passive roller tube, (viii) a single passive dirty side spring hub connected to a far end of the motor roller tube, (ix) a drive spring hub connected to a near end of the motor roller tube and configured to rotate by rotational force generated by the motor assembly, and (x) a control unit and display configured to automate operation of the automatic HVAC filter change system.

In some embodiments, the frame comprises an aluminum frame. In some embodiments, the aluminum frame comprises four connected 20×20 extruded aluminum frame components that connect together to form a square shape as a base component housing of the automatic HVAC filter change system.

In some embodiments, the motor assembly comprises a motor, a primary gear, a secondary gear, a shaft spring, a pressure shaft, and a motor fixing bracket that secures the motor to a motor and drive hub support plate. In some embodiments, the motor assembly further comprises an LED ring, a connector mounting bracket, and a PG connector. In some embodiments, the motor comprises a NEMA motor. In some embodiments, the secondary gear, the shaft spring, and the pressure shaft are connected in line and configured to translate power from the motor through the primary gear to the secondary gear into rotational power that drives the drive spring hub connected to the near end of the motor roller tube and pull the filter media over the grille to wind around the motor roller tube.

In some embodiments, the control unit comprises a printed circuit board (PCB) and processor. In some embodiments, the PCB and processor comprises an ESP32 microcontroller and runtime software.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
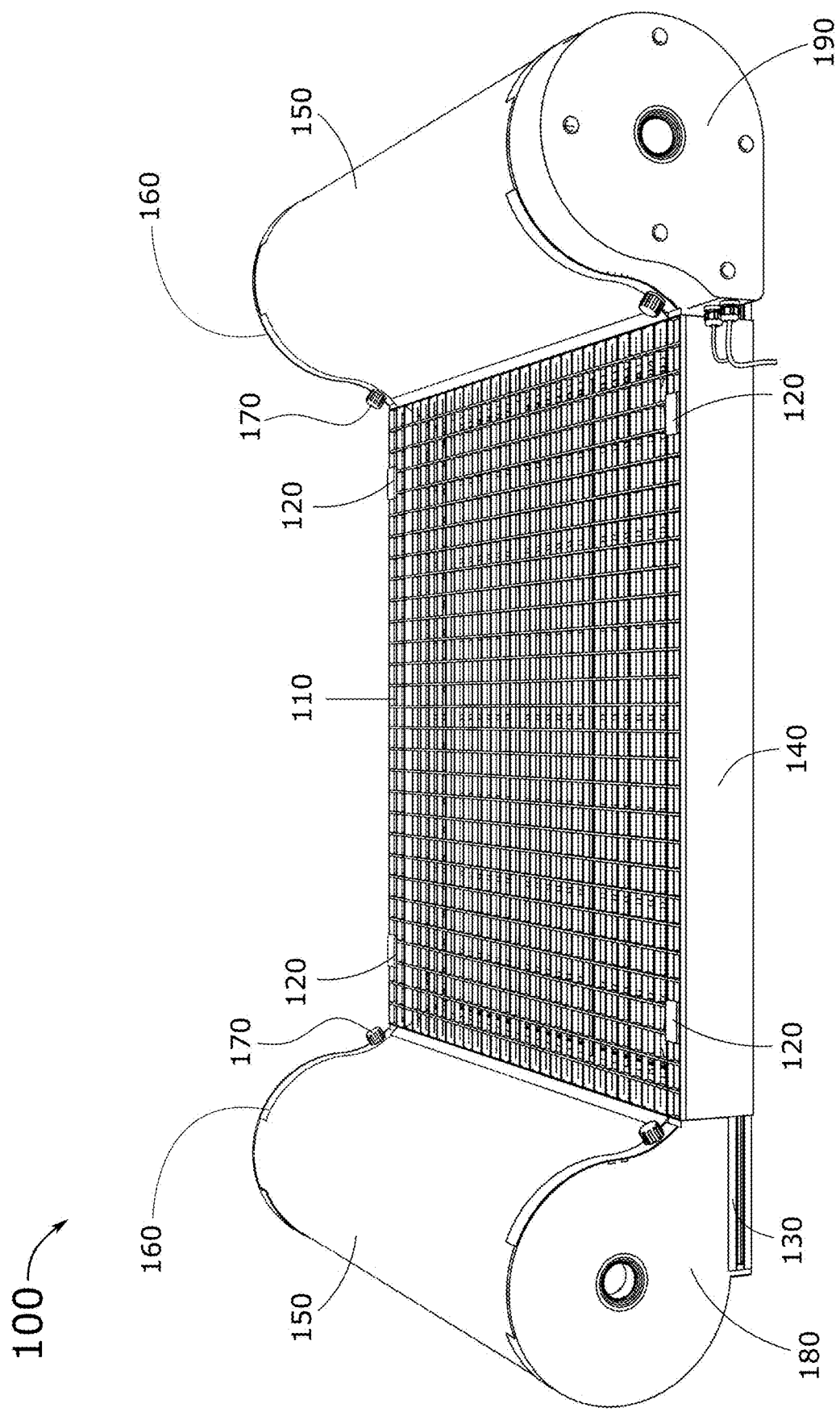
FIG. 1 conceptually illustrates a view of an automatic HVAC filter change system in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

In this specification, the terms "filter", "media", "material", "air filter", "filter media", "air filter media", "filter material", and "air filter material" are synonymous and are meant to describe any filter material that can be used in an HVAC unit.

Embodiments of the invention described in this specification pertain to an automatic HVAC filter change system. In some embodiments, the automatic HVAC filter change system changes filters automatically by way of a design configured to seamless move and change filters on an automated schedule. In some embodiments, the automatic HVAC filter change system provides notification and reminders for when done.

As stated above, people normally change filters of the HVAC system manually. Those people need to change dirty HVAC home or office filters manually over a longer period of time, so they must either schedule the changes or pay attention to the condition of the current filter. As such, manual filter changes require more labor and travel for a simple task which, if it were automated, would be able to provide cleaner air more consistently without all the work and remembering when the change the filter. Embodiments of the automatic HVAC filter change system described in this specification solve such problems by automatically supplying enough filter media and coordinating a software program with hardware of the automatic HVAC filter change system to allow the automatic HVAC filter change system to change the filter itself on a set schedule (per software) through rolling technology over a longer period of time.

Embodiments of the automatic HVAC filter change system described in this specification differ from and improve upon currently existing options. In particular, existing methods for changing filters are mostly manual. Consequently, changing filters often gets overlooked and forgotten due to human error. By contrast, the automatic HVAC filter change system of the present specification is the only one of its kind and is better than older methods for manually changing filters. The automatic HVAC filter change system improves on the existing manual methods for changing filters by automatically changing itself on an automated schedule and reminding an end-user when completed. The automatic HVAC filter change system eliminates human error in the removal and installation of filters. The automatic HVAC filter change system eliminates human errors in schedule filter changes.

The automatic HVAC filter change system of the present disclosure may be comprised of the following elements. This list of possible constituent elements is intended to be exemplary only and it is not intended that this list be used to limit the automatic HVAC filter change system of the present application to just these elements. Persons having ordinary skill in the art relevant to the present disclosure may understand there to be equivalent elements that may be substituted within the present disclosure without changing the essential function or operation of the automatic HVAC filter change system.

1. External decorative grille (also referred to as the "return grille cover", "return grille", "external grille" or simply "grille")
2. Upper part of decorative grille mounting with magnet(s) or other connection, attachment, mountable, etc. component(s)
3. Bolt(s) for securing the flexible cover mounting bracket
4. Filter media (spooled, or wound up, into filter media rolls around tubing that are referred to as "filter media rollers")
5. Flexible cover rubber seal
6. Flexible cover mounting bracket
7. Flexible cover
8. Sealing rubber on the sides of the frame body
9. Lower part of decorative grille mounting with magnet
10. Motor side plastic cover with a transparent layer indicating the device status via one or more LED lights (via an LED ring)
11. Side part right
12. Side part left
13. Motor side
14. Tube for winding filter material
15. Auxiliary spring hub
16. Drive spring hub
17. Filter material guide shaft
18. Lower retaining grid
19. 20×20 extruded aluminum frame
20. Metal sidewall
21. UV-LED strip
22. Spring hub support part
23. Spring hub body
24. Spring
25. Spring hub drive part
26. LED ring
27. Secondary gear
28. Shaft spring
29. Pressure shaft, force transmission to the hub
30. Primary gear
31. Motor fixing bracket
32. Connector mounting bracket
33. PG Connector
34. NEMA motor
35. Sliding plane
36. Spacer transmitting force to the drive hub 37. Bolt seat (or "bolt hole")
38. Rear part of the control unit housing
39. Main control board (printed circuit board or "PCB") and processing unit (e.g., an ESP32 micro-controller and runtime software)
40. Display module (also referred to as the "display screen", "display", or "screen")
41. Front part of the control unit housing The automatic HVAC filter change system of the present disclosure generally works by combination of all components of the automatic HVAC filter change system, which work together by locking in a roll of air filter media used to filter return air for heating and air conditioning appliances or any return intake that requires filtering. All corners and components can be adjusted to accommodate different lengths of filter media. The user selects a set schedule based on how often they want the filter media roll to dispense or change. At the end of its cycle, the automatic HVAC filter change system will notify the user when complete.

The user controls the housing with a controller with a decoder knob selector that selects a schedule that controls a stepper motor using a low power controller, such as a 3-volt micro-controller or other low power controller.

To make the automatic HVAC filter change system of the present disclosure, the automatic HVAC filter change system is assembled using 20×20 extruded aluminum for the frame (housing) and all other components are 3D printed with PETG. The automatic HVAC filter change system uses off-the-shelf parts for the control box and an ESP32 micro-controller for the software to run for the automatic HVAC filter change system.

By way of example, FIG. 1 conceptually illustrates a view of an automatic HVAC filter change system 100. As shown in this figure, the automatic HVAC filter change system 100 comprises a grille 110, a plurality of grille mounting hardware connectors 120, a frame 130, a frame sidewall 140, a plurality of filter media roller covers 150, a plurality of cover mounting brackets 160, a plurality of bolts 170, a plurality of auxiliary filter media roller end cap plates 180, and a motor filter media roller end cap 190.

In some embodiments, the grille 110 is an external decorative grille. In some embodiments, each connector 120 in the plurality of grille mounting hardware connectors 120 comprises a magnet that mounts to a ferrous metal mount point of the automatic HVAC filter change system 100. In some embodiments, the frame 130 comprises a 20×20 extruded aluminum frame. In some embodiments, the frame sidewall 140 comprises a metal sidewall. In some embodiments, the plurality of filter media roller covers 150 are flexible lids that cover an inner filter media roller compartment of the automatic HVAC filter change system 100 in which filter media rollers are inserted. In some embodiments, the cover mounting brackets 160 are flexible cover mounting brackets. In some embodiments, the plurality of bolts 170 secure the plurality of cover mounting brackets 160 to the filter media roller covers 150. In some embodiments, the plurality of auxiliary filter media roller end cap plates 180 comprise a plurality of passive hub roller support plates. In some embodiments, the motor filter media roller end cap 190 covers a motor assembly that is connected to a motor and drive hub support plate. Further details of the motor assembly are described below, by reference to FIG. 10. In some embodiments, the motor filter media roller end cap 190 comprises a plastic cover with a layer that indicates operational status of the automatic HVAC filter change system 100. In some embodiments, the layer comprises a transparent layer. In some embodiments, the layer comprises a translucent layer. Further information about assembling some of the components of the automatic HVAC filter change system 100 is described next, by reference to FIG. 2.

Figure 2:
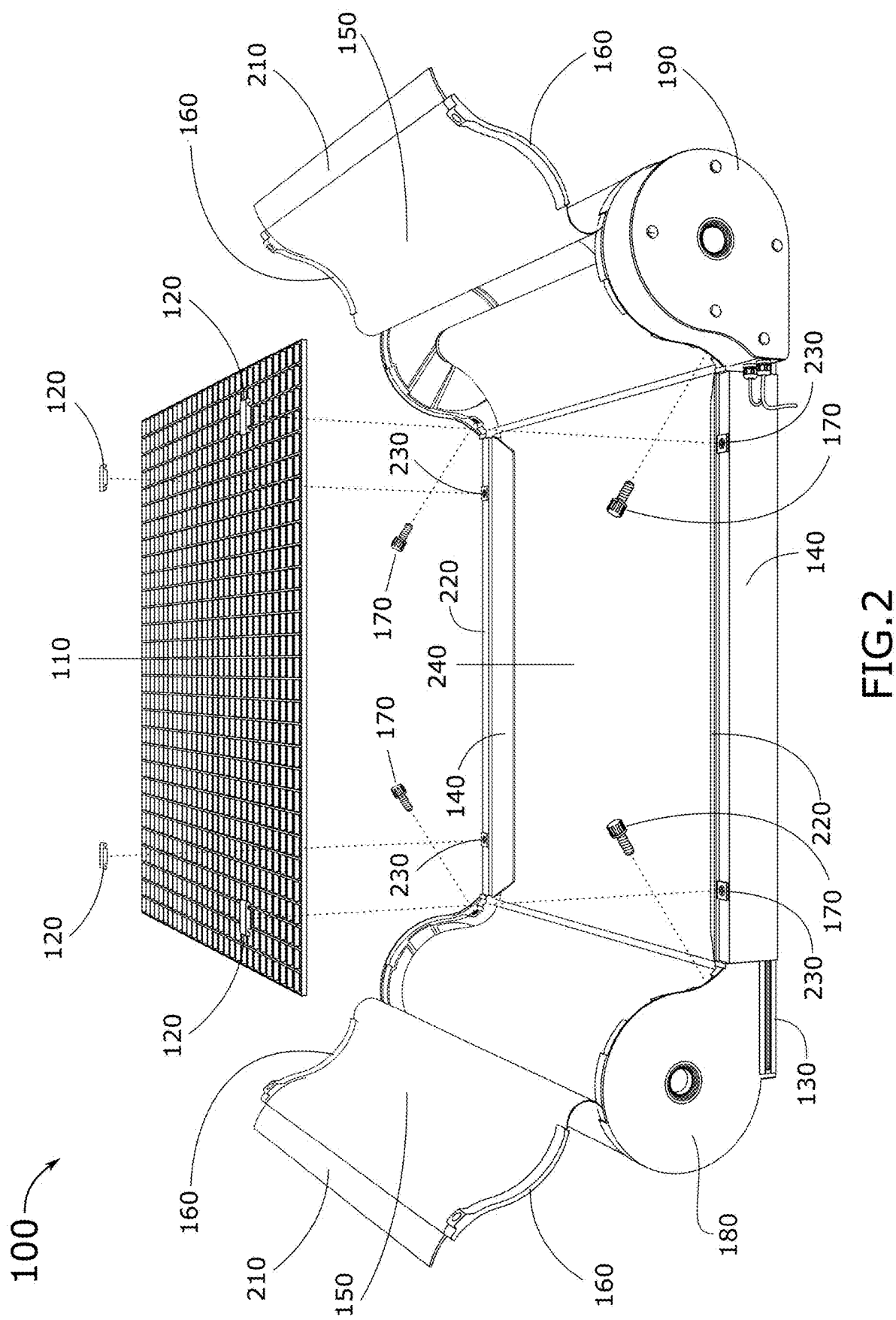
FIG. 2 conceptually illustrates a partially exploded view of the automatic HVAC filter change system in some embodiments with the external grill and bolts removed and the filter material roller lids open.

Specifically, FIG. 2 conceptually illustrates a partially exploded view of the automatic HVAC filter change system 100. In this view, other components of the automatic HVAC filter change system 100 are shown including a plurality of flexible cover rubber seals 210 disposed along edges of the plurality of filter media roller covers 150, sealing rubber 220 on the sides of the frame body, a plurality of mounting hardware connectors 230 that are mated for connection to the plurality of grille mounting hardware connectors 120, and filter media 240. Also, the grille 110 is removed when the plurality of grille mounting hardware connectors 120 are disconnected from the plurality of mounting hardware connectors 230. Similarly, the plurality of filter media roller covers 150 are able to be opened when the bolts 170 are removed. The filter media 240 shown here starts as a filter media roller in which the filter media unwinds (from the left side as shown in this figure) and spans across the automatic HVAC filter change system 100 to a used filter media side (shown in this figure on the right side). During operation, the grille 110 is re-attached so that the filter media 240 appears under the grille 110. The filter media 240 gets spooled or collected after it has been used. This operation is automatic, by action of the motor assembly that is present under the motor filter media roller end cap 190. In particular, the motor assembly drives a tube on the right side (which can be considered the used filter media side) to wind up the spent filter media 240, according to the settings and program operation of the automatic HVAC filter change system 100. In addition to adding the grille 110 during normal operation, the plurality of filter media roller covers 150 are also closed and the bolts 170 are inserted into their respective bolt holes. Note also that when the grille mounting hardware connectors 120 are magnetized, then the plurality of mounting hardware connectors 230 would normally be made of a ferrous metal. However, other connecting hardware combinations are also viable alternatives to magnetized mounting hardware connectors 230 and grille mounting hardware connectors 120. Furthermore, the flexible cover rubber seals 210 prevent dust and debris from entering into the filter media compartments while allowing easy egress out of one filter media compartment as the filter media 240 unrolls from the filter media roller and easy ingress into the opposite side filter media compartment as the motor assembly drives the hub to wind up the used/spent filter media 240.

Figure 3:
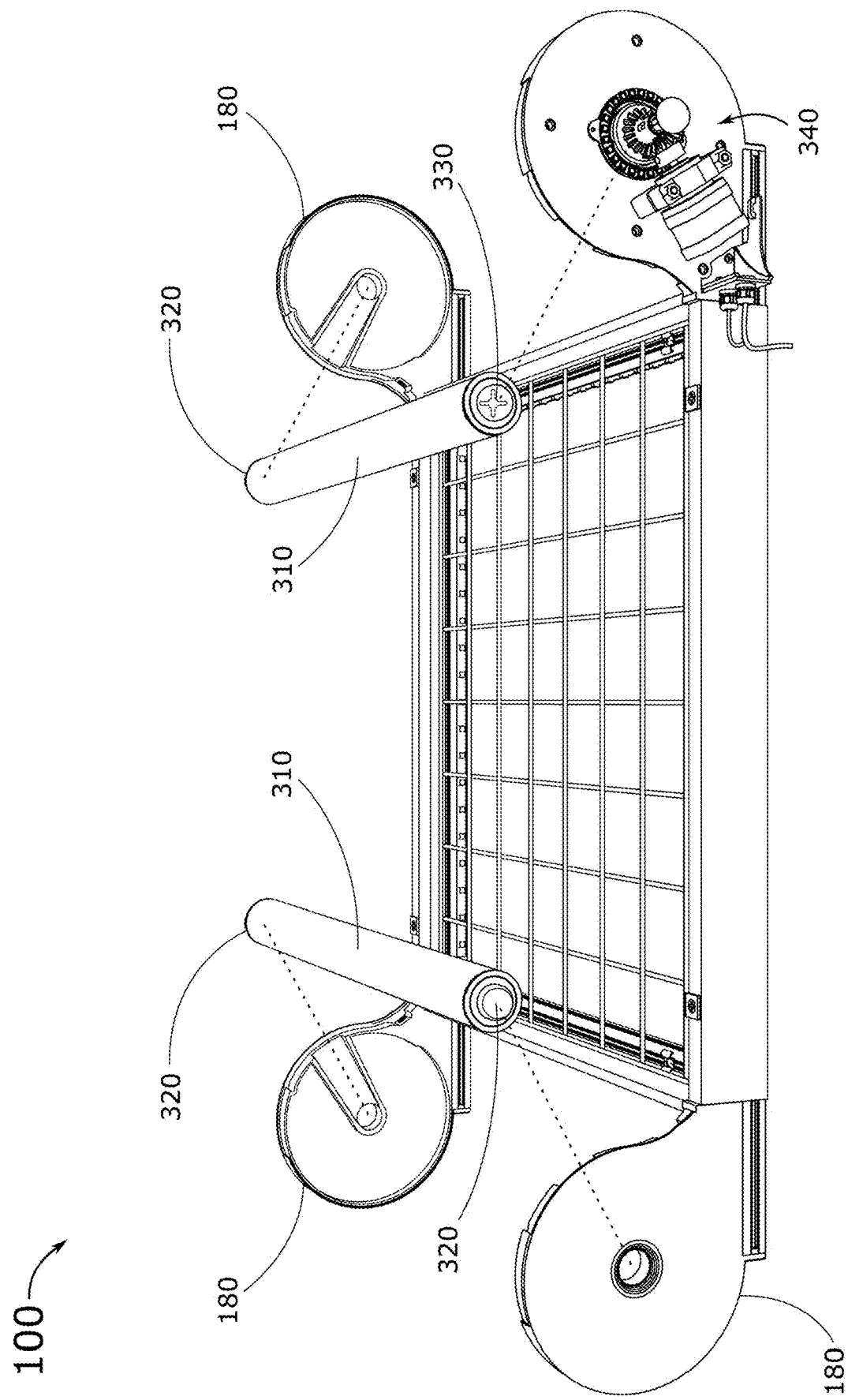
FIG. 3 conceptually illustrates filter material fastening components of the automatic HVAC filter change system in some embodiments.

By way of another example, FIG. 3 conceptually illustrates filter material fastening components of the automatic HVAC filter change system 100. In this view, the external grille 110, the filter media roller flexible covers 150, and associated hardware, such as the rubber seals 210, cover mounting brackets 160, and bolts 170, are not shown. This allows an unobstructed view of several filter material fastening components including the plurality of auxiliary filter media roller end cap plates 180, a plurality of filter media tubes 310, a plurality of auxiliary spring hubs 320, a drive spring hub 330, and a motor assembly 340.

Notably, the plurality of filter media tubes 310 comprise a left-side tube 310 for releasing the filter media from its filter media roller and a right-side tube 310 for winding up the filter material 240. While the left and right-sided aspects are relative to a position of a viewer, these directional viewpoints are used for explanation in viewing this example shown in FIG. 3. To be more specific, the left-side tube 310 for releasing the filter media from its filter media roller includes two auxiliary spring hubs 320 (one auxiliary spring hub 320 at each end of the left-side tube 310) while the right-side tube 310 for winding up the filter material 240 includes only one auxiliary spring hub 320 at one end with the drive spring hub 330 at the other end of the tube 310. The drive spring hub 330 would be positioned at the end of the tube 310 which is proximate to the motor assembly 340. The auxiliary spring hub 320 is described below, by reference to FIGS. 6-7 while the drive spring hub 330 is further detailed below, by reference to FIGS. 8-9. The drive spring hub 330 would be oriented to face mated connectors of the motor assembly 340, thereby enabling the motor assembly 340 to rotate the drive spring hub 330 (and its associated tube 310) in order to wind up the used filter media 240. Further details of the motor assembly 340 are described below, by reference to FIG. 10.

Beyond merely winding up the spent filter media 240, a corresponding result of the motor assembly 340 operation is that as it drives the drive spring hub 330 and winds up the filter media 240, it also pulls the filter media 240 from its source—that is, from the filter media roller—and out across the area of automatic HVAC filter change system 100 at which the grille 110 is positioned during operation.

Figure 4:
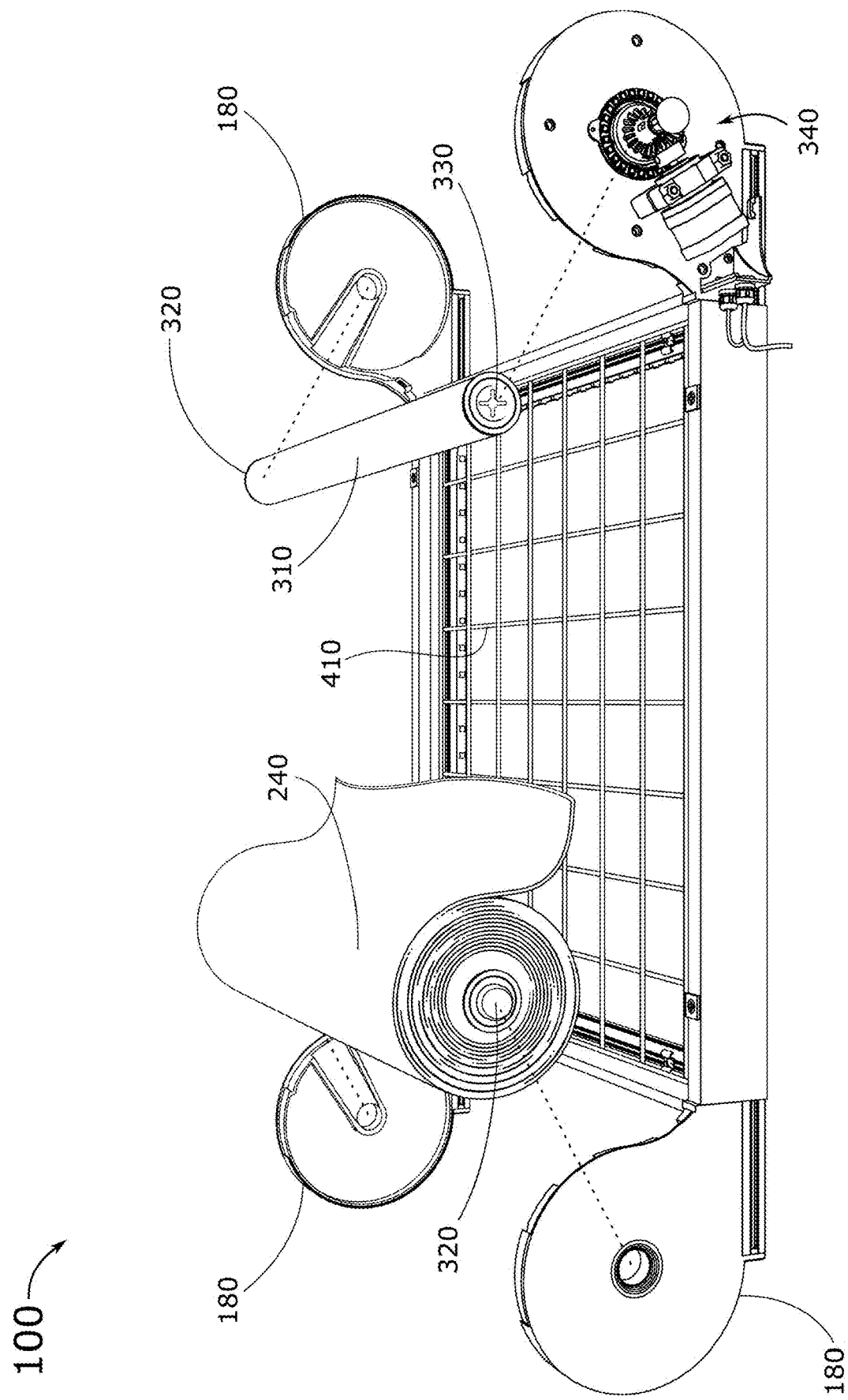
FIG. 4 conceptually illustrates a filter media roller being added to the filter material fastening components of the automatic HVAC filter change system in some embodiments.

This is demonstrated in FIG. 4, which conceptually illustrates a filter media roller being added to the filter material fastening components of the automatic HVAC filter change system 100. As shown in this figure, the automatic HVAC filter change system 100 includes a lower retaining grid 410 that is secured to the frame 130 and sidewalls 140 and acts as a platform upon which the filter media 240 will spread across when unrolled. Further details of how the lower retaining grid 410 and the filter material fastening components of the automatic HVAC filter change system 100 are organized with respect to each other are described below, by reference to FIG. 5. In FIG. 4, however, the filter media 240 is shown to be completely wound up into a filter media roller. To insert the filter media roller into position, the two auxiliary spring hubs 320 of the tube 310 (around which the filter media 240 is wound) slide into the slots of the auxiliary filter media roller end cap plates 180. Similarly, the opposite side tube 310—with the drive motor hub 330 and the single auxiliary spring hub 320—is inserted into the corresponding slots of the other side. Then a person (or "user") may manually pull the filter media 240 across the lower retaining grid 410 and connect to the opposite side tube 310, with clamps, spring clips, adhesives, or other attachment options. This basic setup would be followed by reattaching the external grille 110, closing the covers 150 (which are not shown in this figure, but would simply be opened to install the filter media roller), and fastening the bolts 170.

Figure 5:
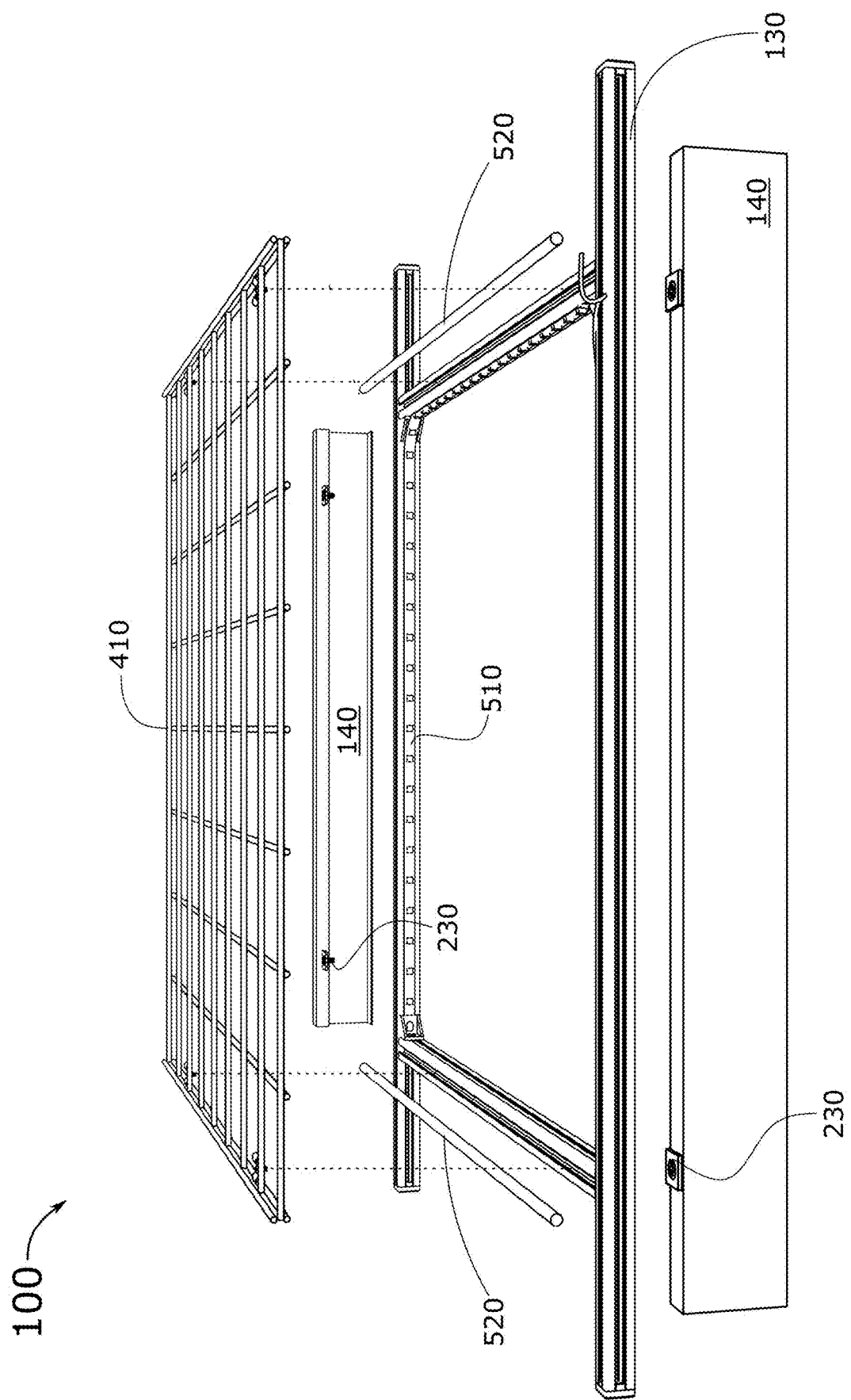
FIG. 5 conceptually illustrates a frame and other frame elements of the automatic HVAC filter change system in some embodiments.

By way of example, FIG. 5 conceptually illustrates an exploded view of the filter material fastening components, including frame and other frame elements, of the automatic HVAC filter change system 100. Specifically, the lower retaining grid 410 is shown to connect to the frame 130 while the frame sidewalls 140 attached to the frame 130 and provide external edge surfaces for the automatic HVAC filter change system 100. In some embodiments, the frame sidewalls 140 are made of a metal material. Other elements are also shown in this figure including the mounting hardware mated connectors 230, an ultra violet-light emitting diode ("UV-LED") strip 510 that is disposed along inner side surfaces of the frame 130, and a plurality of filter material guide shafts 520. As noted above, the frame 130 may be made of extruded aluminum (of a particular size, such as 20×20 extruded aluminum in some embodiments). Being of aluminum construction, the UV-LED strip 510 may be fastened to the frame 130 by a strong adhesive or other connection method. The frame sidewalls 140 are normally constructed of a metal, which means the mounting hardware mated connectors 230 are drilled through the metal to attach to the sidewalls 140 at positions that allow easy connection by the grille mounting hardware connectors 120 (thereby securing the external grille 110 in place during operation).

As described above, by reference to FIGS. 3 and 4, the auxiliary spring hubs 320 and the drive spring hub 330 are key for operation of the automatic HVAC filter change system 100. In particular, the drive spring hub 330 is mated for connection to components of the motor assembly 340 and, therefore, is an active element for automating the automatic HVAC filter change system—essentially driving operation of winding up the used/spent filter media. On the other hand, the auxiliary spring hubs 320 are passive, as they are designed to rotate freely by the driving force applied to the drive spring hub 330 by the motor assembly 340. In this way, the auxiliary spring hubs 320 rotate and work in connection with the drive spring hub 330 and motor assembly 340 to ensure that the filter media 240 is released from the filter media roller and wound up on the other side during operation. These are demonstrated and described next, by reference to FIGS. 6-9.

Figure 6:
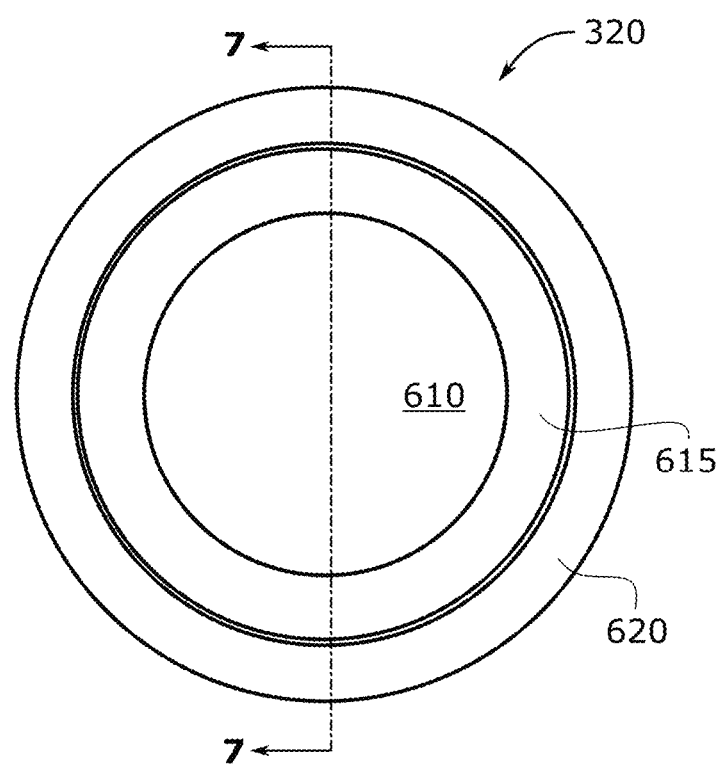
FIG. 6 conceptually illustrates a front view of an auxiliary spring hub in some embodiments of the automatic HVAC filter change system.
Figure 7:
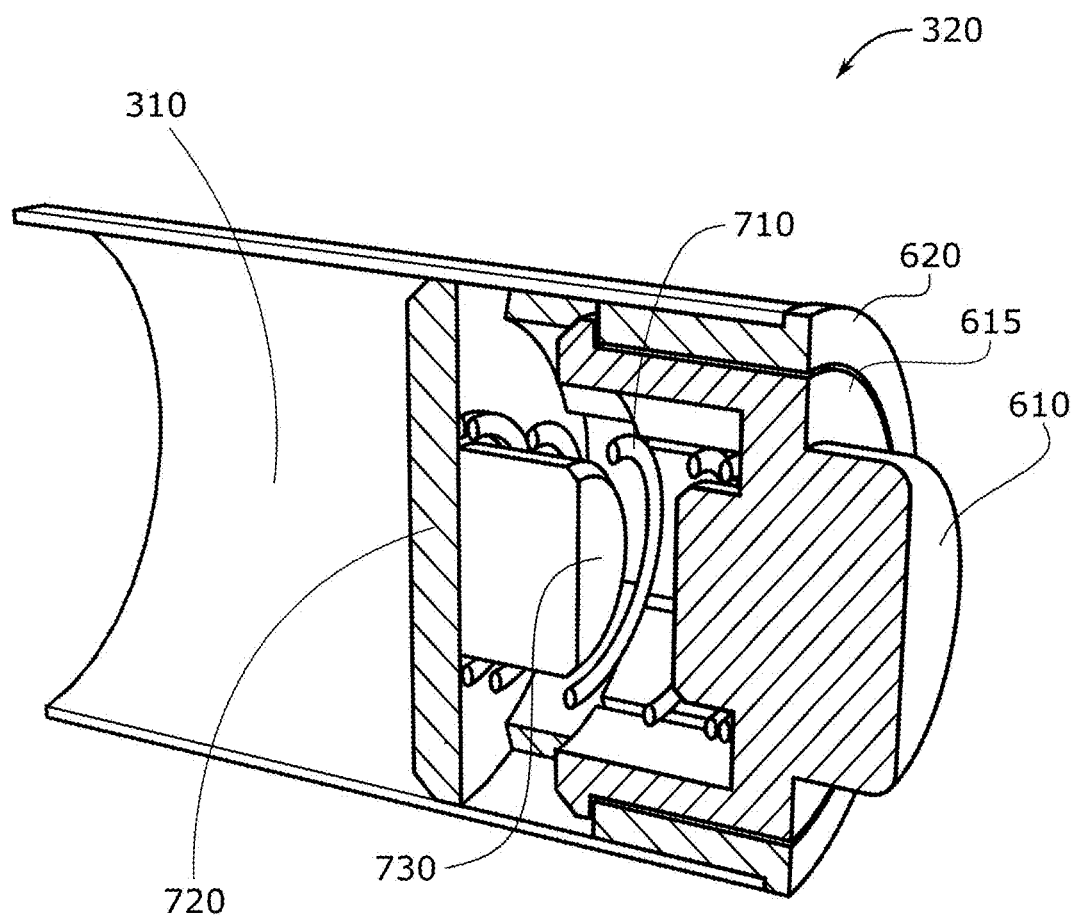
FIG. 7 conceptually illustrates a cross-sectional view of the auxiliary spring hub along line 7-7 shown in FIG. 6.

First referring to FIG. 6, a front view of an auxiliary spring hub 320 is shown. The auxiliary spring hub 320 includes different components, namely, an auxiliary (passive) spring hub knob 610, a spring hub knob support base 615, and a spring hub body 620. Turning to FIG. 7, which conceptually illustrates a cross-sectional view of this auxiliary spring hub 320 (along line 7-7 shown in FIG. 6), the form of the spring hub knob 610 juts out further than the other components while the spring hub knob support base 615 is the base platform of the spring hub know 610 (in some embodiments, these are a single component).

Surrounding the spring hub knob 610 and the spring hub knob support base 615 is the spring hub body 620. The spring hub body 620 is a disjoint from the combined component of the spring hub knob 610 and spring hub knob support base 615. The spring hub body 620 also is the component to which the tube 310 attaches (at each end). Thus, as shown in this figure, the tube 310 may be hollow. Encapsulated within the tube 310 are further components of the auxiliary spring hub 320 including a spring 710, a spring hub body and spring base 720, and a spring hub body stopper 730. The spring 710 enables flexible positioning of the spring hub knob 610 and the spring hub knob support base 615 without similar movement of the spring hub body 620. This allows the auxiliary spring hub 320 to be slid into position within the slot of the corresponding auxiliary filter media roller end cap 180. The spring hub body stopper 730 is disposed on the spring hub body and spring base 720 and is configured to prevent too far a movement into the tube 310 by the combined spring hub knob 610 and spring hub knob support base 615. In this way, there is a small, but significant, amount of distance in which the combined spring hub knob 610 and spring hub knob support base 615 can move in and out of the tube 310 for insertion into a center aperture of the corresponding auxiliary filter media roller end cap 180, which is sized to hold the spring hub knob 610 in place while unraveling or winding up the filter media, but with enough freedom to rotate as freely as dictated by the driving force of the motor assembly 340.

Figure 8:
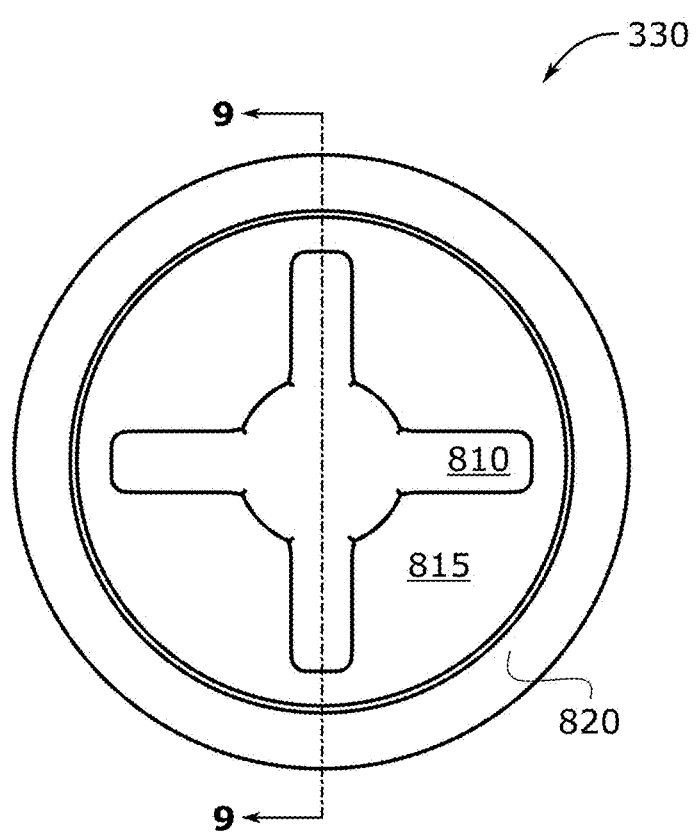
FIG. 8 conceptually illustrates a front view of a drive spring hub in some embodiments of the automatic HVAC filter change system.
Figure 9:
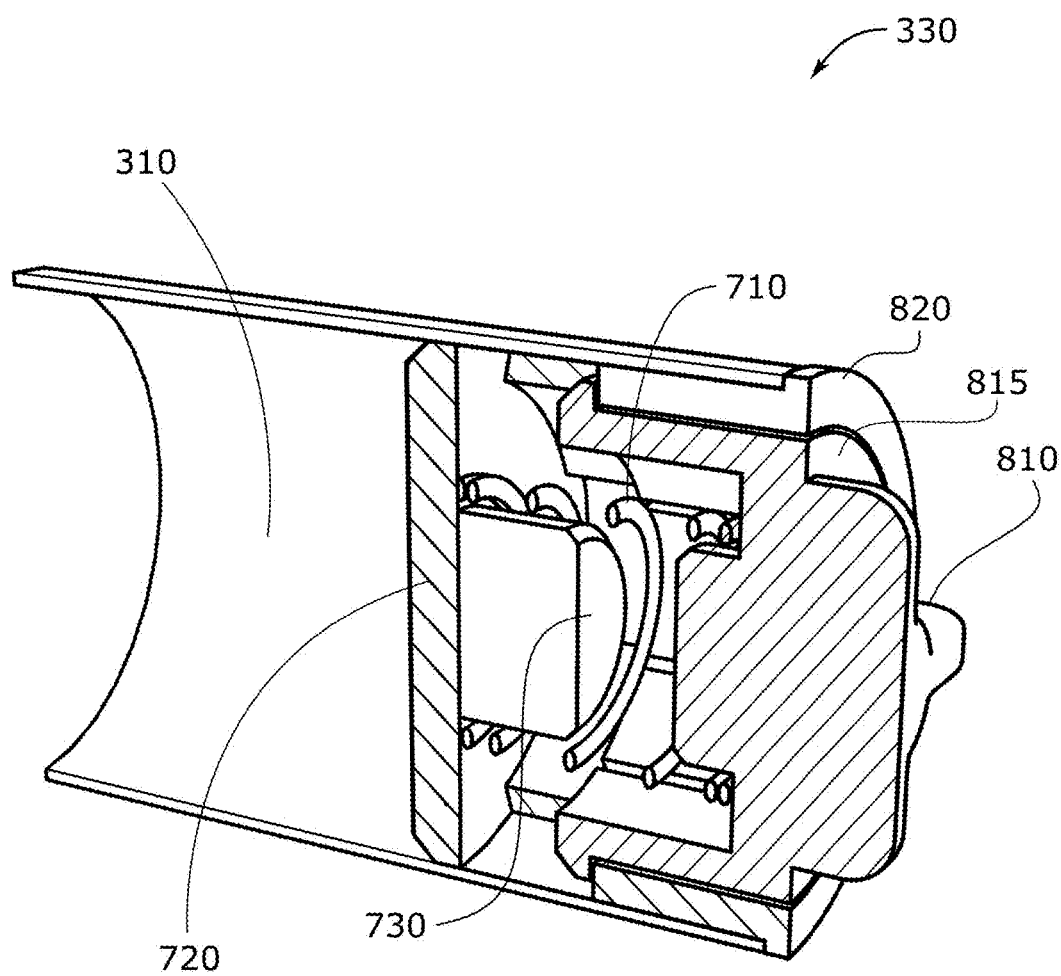
FIG. 9 conceptually illustrates a cross-sectional view of the drive spring hub along line 9-9 shown in FIG. 8.

Turning to FIGS. 8-9, a front view of the drive spring hub 330 is shown in FIG. 8 and a cross-sectional view of the drive spring hub 330 is shown in FIG. 9. In particular, the cross-sectional view shown in FIG. 9 is the view as taken along line 9-9 of FIG. 8. Starting with the view in FIG. 8, the drive spring hub 330 includes a drive hub lock knob 810, a drive hub lock knob support base 815, and a drive hub body 820. In FIG. 9, the drive hub lock knob support base 815 is shown to be a connected platform base for the drive hub lock knob 810—in most cases these components are a single formed component, just like the combination spring hub knob 610 and spring hub knob support base 615, described above by reference to FIGS. 6-7. The drive hub body 820 is a disjoint component from that combined drive hub lock knob 810 and drive hub lock knob support base 815 combination component.

The drive hub body 820 (like the spring hub body 620) is the component to which the tube 310 attaches, but in this case, only one end of the tube 310, since the other end of the end has one of the auxiliary (passive) spring hub 320 attached. Again, the tube 310 may and thereby allow for other components to be encapsulated within. In this case, the encapsulated components of the drive spring hub 330 are like those of the auxiliary spring hub 320—namely, a spring 710, a spring hub body and spring base 720, and a spring hub body stopper 730, all of which work in similar ways as noted above in the description of FIG. 7. One essential difference between the drive spring hub 330 and the auxiliary spring hub 320 is that the drive hub lock knob 810 is shaped differently. In this figure, the shape is a cross, like a Philips head or plus sign, cross shape, etc. This is mated to a corresponding component of the motor assembly 340 to enable driving force to provide torque to rotate the drive spring hub 330 and connected tube 310. The motor assembly 340 is described in detail next, by reference to FIG. 10.

Figure 10:
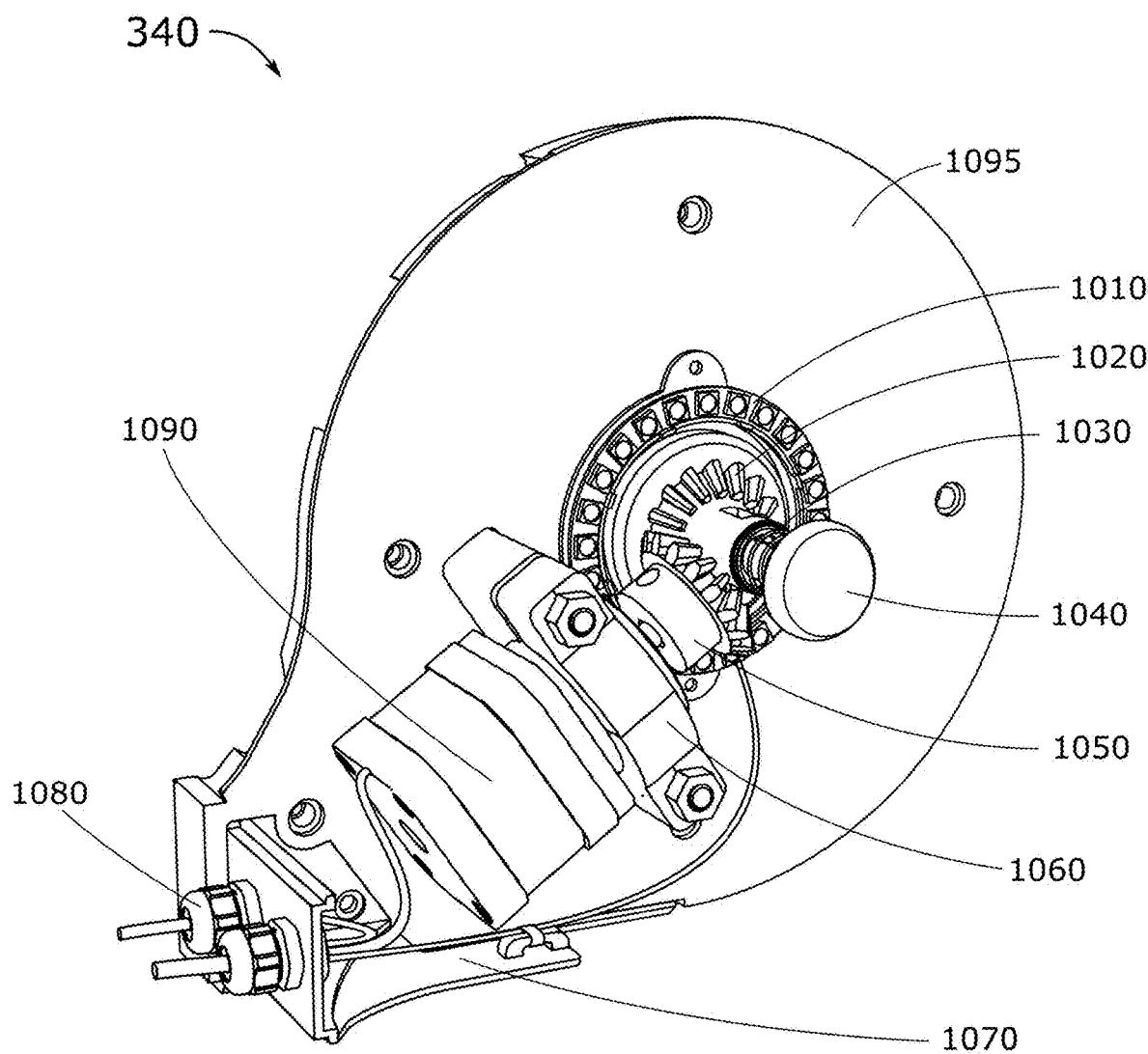
FIG. 10 conceptually illustrates a front view of a motor assembly attached to a motor and drive hub support plate in some embodiments of the automatic HVAC filter change system.

In particular, FIG. 10 conceptually illustrates a front view of the motor assembly 340 that powers the automatic HVAC filter change system 100 during operation. As shown in this figure, the motor assembly 340 includes a light emitting diode ("LED") ring 1010, a secondary gear 1020, a shaft spring 1030, a pressure shaft 1040 that provides force transmission to the drive spring hub 330 (not shown in this figure), a primary gear 1050, a motor fixing bracket 1060, a connector mounting bracket 1070, a PG connector 1080 that attaches to electrical/power wiring, and a NEMA motor 1090. Also, the entire motor assembly 340 and its components are attached to a motor and drive hub support plate 1095. An opposite side view of the motor and drive hub support plate 1095, described by reference to FIG. 11, demonstrates how the drive spring hub 330 connects to a corresponding mate that enables force to be transmitted into rotational force acting on the drive spring hub 330 and connected tube 310.

These motor assembly 340 components operate by the power generated via the NEMA motor 1090, which is secured to the motor and drive hub support plate 1095 by the motor fixing bracket 1060. Specifically, the primary gear 1050 is connected to the NEMA motor 1090. The secondary gear 1020 connects to the primary gear 1050 in a way that translates the force from the motor 1090 through the primary gear 1050 into rotational torque power that drives the rotation of the drive spring hub 330 (by way of a mated connector component, described below by reference to FIG. 11). Also, the shaft spring 1030 and the pressure shaft 1040 connect in line with the secondary gear 1020 to provide the force transmission to the drive spring hub 330.

Figure 11:
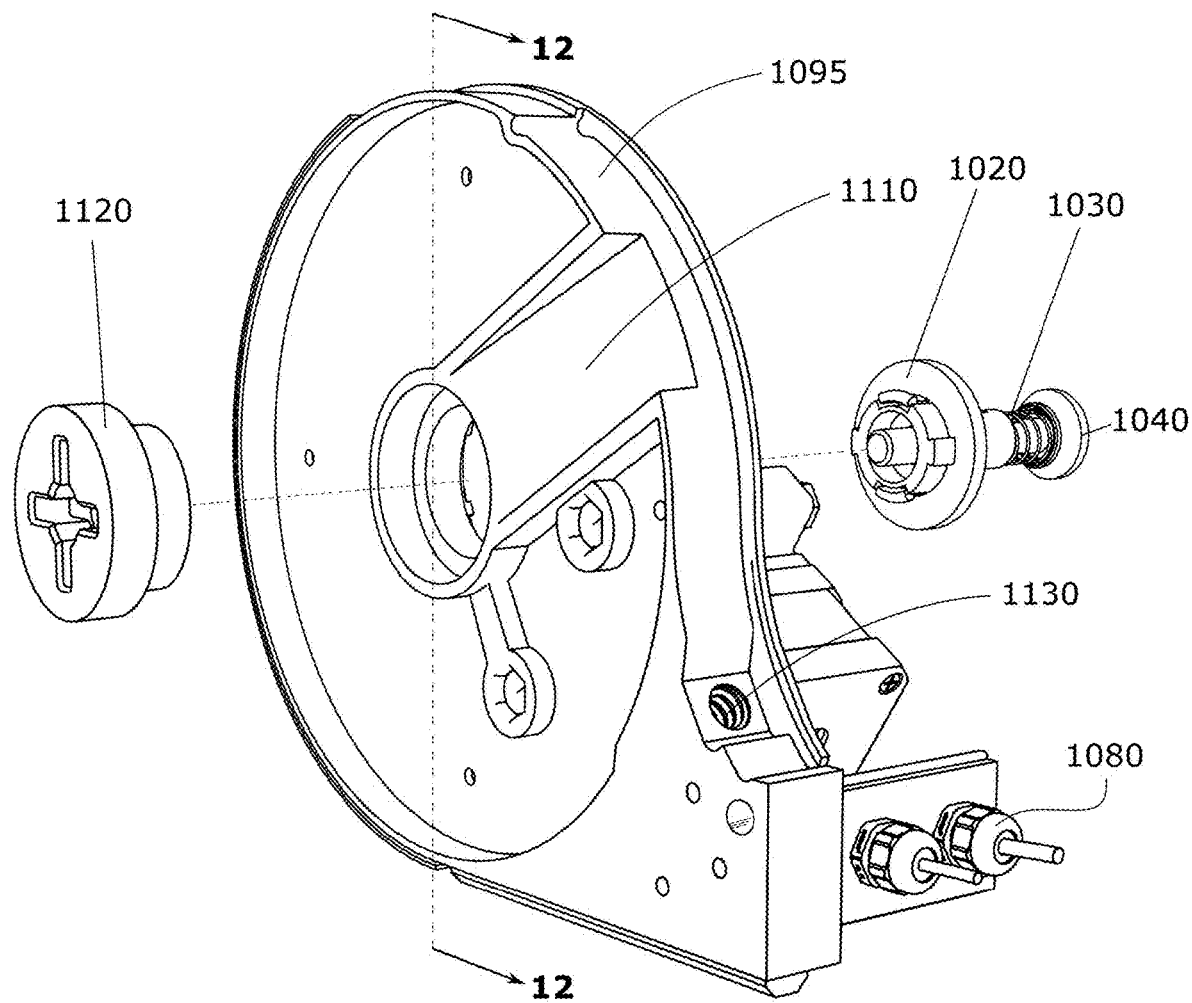
FIG. 11 conceptually illustrates a rear view of the motor and drive hub support plate showing the torque transmission components from the motor assembly to the drive spring hub in some embodiments the automatic HVAC filter change system.

Now referring to the other side of the motor and drive hub support plate 1095, FIG. 11 conceptually illustrates a rear view of the motor and drive hub support plate 1095 demonstrating the torque transmission components that are involved in driving rotation of the drive spring hub 330. As shown in this figure, the motor side of the motor and drive hub support plate 1095 demonstrates the secondary gear 1020, the shaft spring 1030, and the pressure shaft 1040 being attached together in line to force transmission to the drive spring hub 330.

On the other side of the motor and drive hub support plate 1095, other components are shown including a sliding plane 1110 and a keyed spacer 1120. Also shown is a bolt seat 1130 (or bolt hole 1130). While a bolt 170 is not shown in this figure, the bolt seat 1130 is configured for insertion of the bolt 170 to secure the cover mounting bracket 160 in place. An example of securing the cover mounting brackets 160 (and, therefore, securing the filter media roller flexible covers 150) with a bolt 170 inserted into a bolt seat 1130 is described below, by reference to FIG. 13.

Turning back to FIG. 11, the sliding plane 1110 (or slot 1110) enables the drive hub lock knob 810 and drive hub lock knob support base 815 to compress inward by compression of the encapsulated spring 710, until the drive hub lock knob 810 is positioned in line with the aperture of the motor and drive hub support plate 1095. When in line with the aperture, there is a natural releasing of the tension of the spring 710, thereby allowing the drive hub lock knob 810 to pop out within the aperture and the drive hub lock knob support base 815 to pop out flush against the surface of the motor and drive hub support plate 1095. However, with the keyed spacer positioned within the aperture, the shape of the drive hub lock knob 810 must be aligned to fit within the corresponding shape of the mated component—that is, the keyed spacer 1120, which itself is connected to the secondary gear 1020 and is the first component that rotates by the driving force initiated through the motor 1090. This overall connection between components is described next, by reference to FIG. 12.

Figure 12:
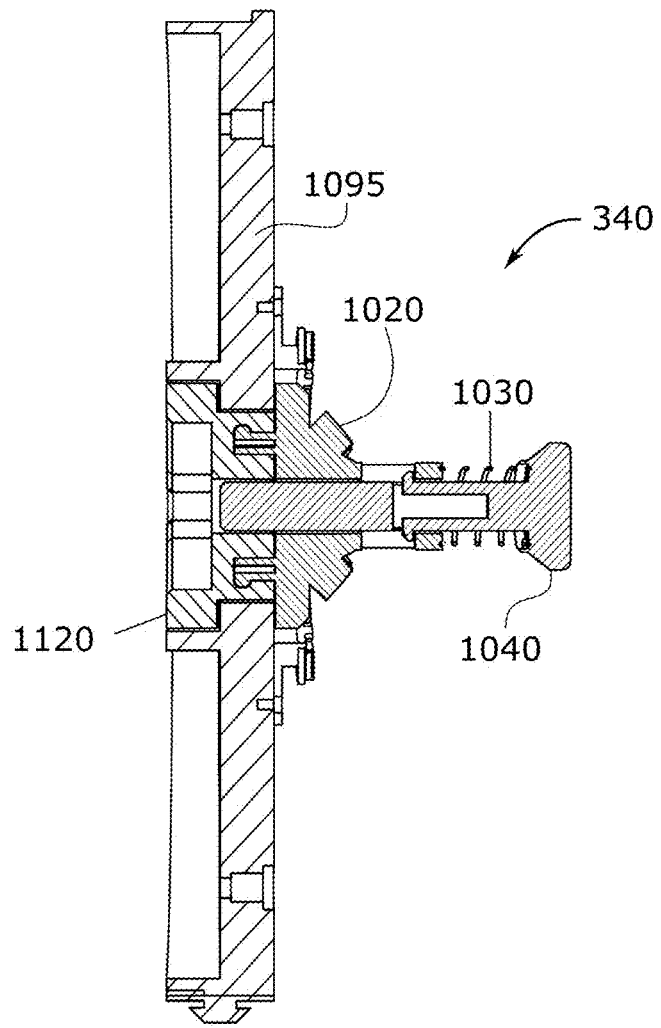
FIG. 12 conceptually illustrates a cross-sectional view of the motor and drive hub support plate showing the torque transmission components from the motor assembly to the drive spring hub shown along line 12-12 shown in FIG. 11.

In particular, the view shown in FIG. 12 is a cross-sectional view of parts of the motor assembly 340 and other components shown along line 12-12 of FIG. 11. As shown in this figure, the keyed spacer 1120 fits within the aperture of the motor and drive hub support plate 1095 with the mate/cross-shape side facing the corresponding shape of the drive hub lock knob 810. Although these examples show a cross-shape design, other shapes of the drive hub lock knob 810 and the mated component are possible. Thus, whether cross-shaped or otherwise, the shapes of these two components—the drive hub lock knob 810 and the keyed spacer 1120—are mirrors of each other and configured to be mated together during connection. The other side of the keyed spacer 1120 is attached to the secondary gear 1020, which itself connects in line with the shaft spring 1030 and the pressure shaft 1040.

Figure 13:
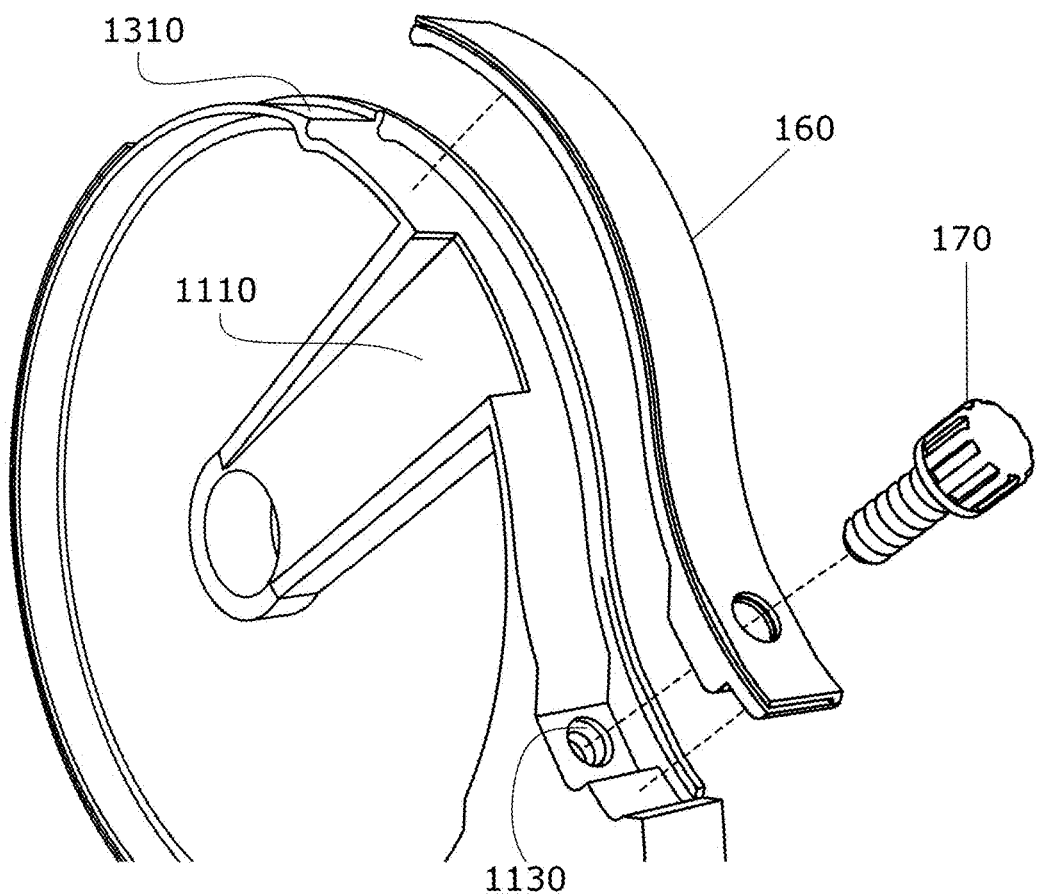
FIG. 13 conceptually illustrates a perspective view of securing a cover mounting bracket to a hub roller support plate by insertion of a bolt into a bolt seat of the hub roller support plate in some embodiments.
Figure 14:
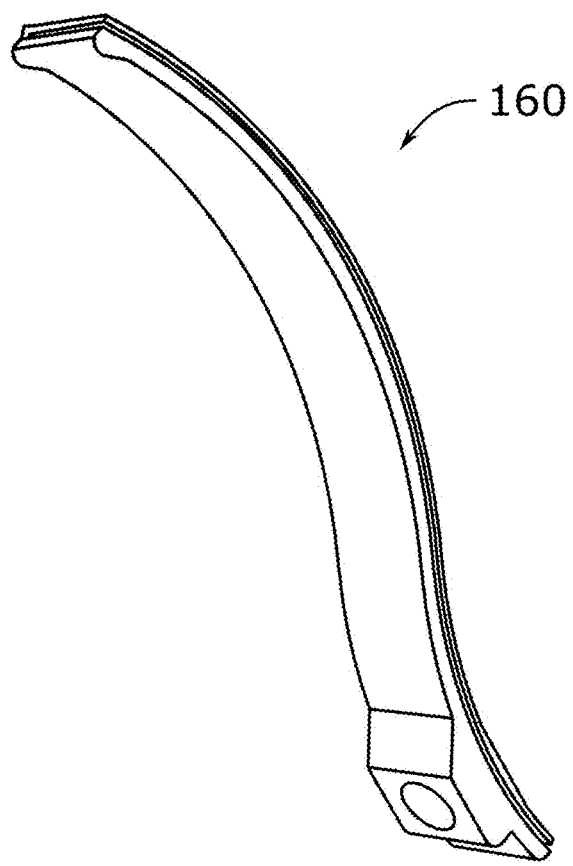
FIG. 14 conceptually illustrates a perspective view of the flexible mounting bracket in some embodiments of the automatic HVAC filter change system.

Turning to another example view, FIG. 13 conceptually illustrates a perspective view of securing a cover mounting bracket 160 to a hub roller support plate 1310 by insertion of a bolt 170 into the bolt seat 1130 of the hub roller support plate. An example of a cover mounting bracket is shown in FIG. 14, which provides a perspective view of the flexible mounting bracket 160 from an underside/opposite side.

Figure 15:
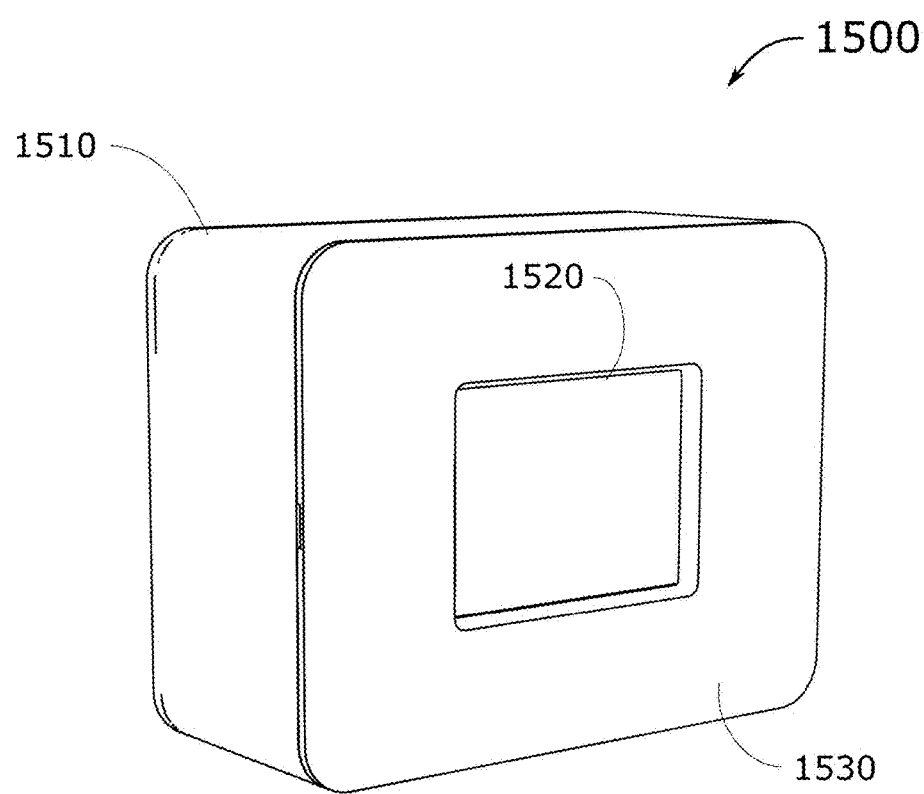
FIG. 15 conceptually illustrates a front perspective view of a control unit in some embodiments of the automatic HVAC filter change system.

In order to program and automate operation of the automatic HVAC filter change system, another key component is an electronic system with a controller and display screen, and several controller board components that enable programs to be configured, saved, and run to operate the automatic HVAC filter change system. Examples of such as controller electronic system (or control unit) are described next, by reference to FIGS. 15-17. Turning first to FIG. 15, a front perspective view of a control unit 1500 is shown. The control unit 1500 shown in this figure includes a control unit housing 1510, a display screen 1520 (or "display screen module"), and a front panel 1530 with an opening for the display screen 1520. Notably, the front panel 1530 connects to the control unit housing 1510 to encapsulate other control hardware and housing hardware components, as described next by reference to FIGS. 16-17.

Figure 16:
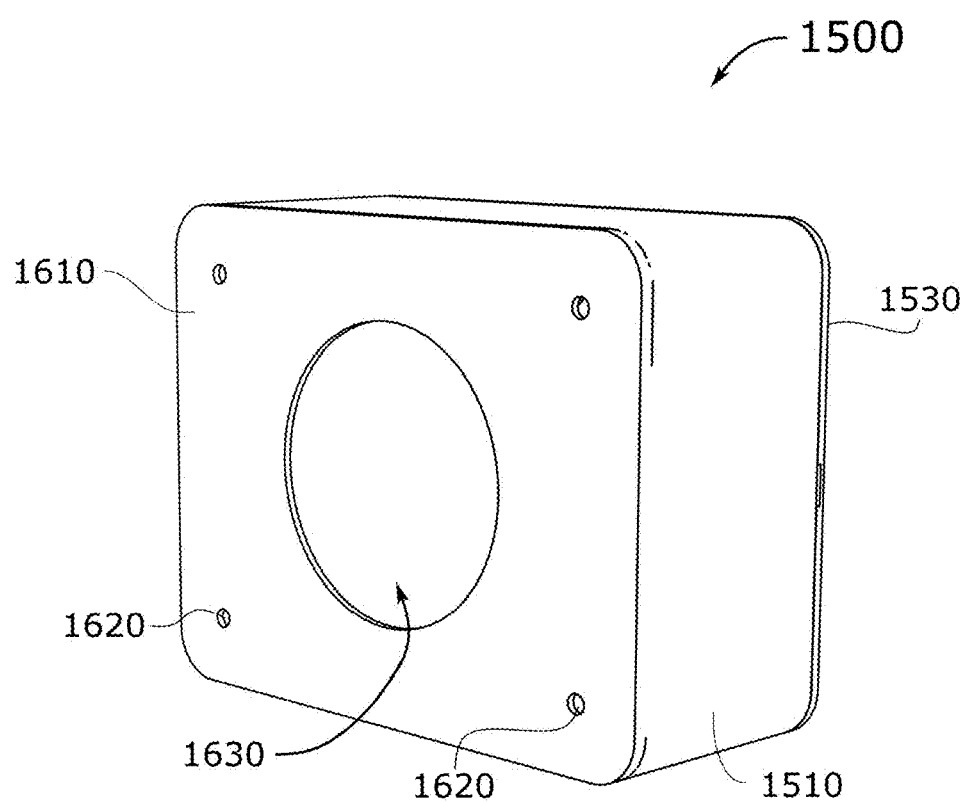
FIG. 16 conceptually illustrates a rear perspective view of the control unit in some embodiments of the automatic HVAC filter change system.

FIG. 16 conceptually illustrates a rear perspective view of the control unit 1500. From this rear perspective view, the control unit 1500 is shown to include a bottom side 1610 of the control unit housing 1510. The bottom side 1610 sits opposite the front panel 1530 in connection with the control unit housing 1510. Also, the bottom side 1610 includes a plurality of control unit mounting holes 1620 that allow the control unit 1500 to be mounted to a wall or other surface by screws, bolts, or other attachment means. Furthermore, a control wiring aperture 1630 is cut out of the bottom side 1610 panel to provide space for wiring to external power and to and from the PG connectors 1080 of the automatic HVAC filter change system 100.

Figure 17:
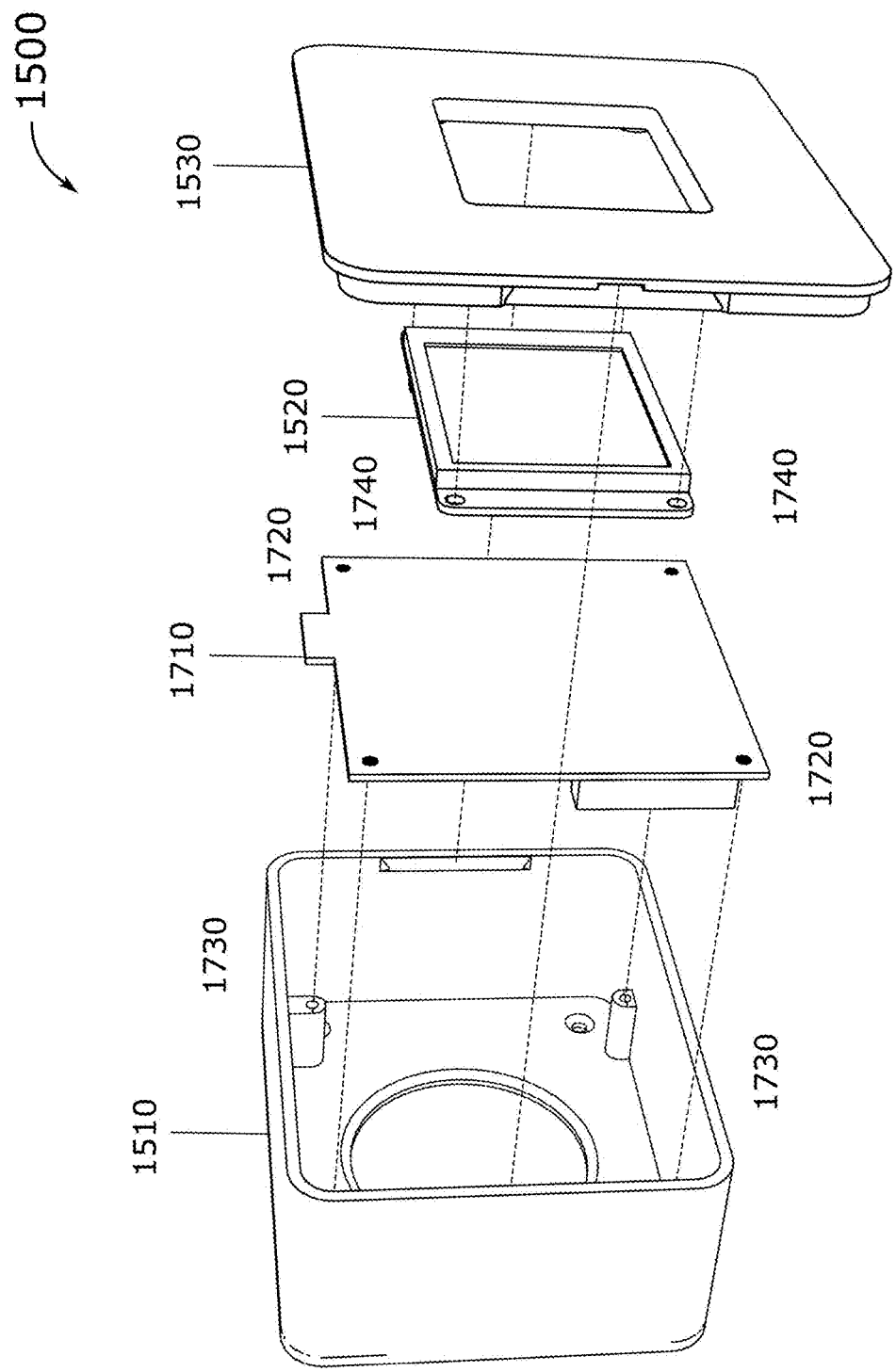
FIG. 17 conceptually illustrates an exploded view of the control unit in some embodiments of the automatic HVAC filter change system.

Another view is demonstrated in FIG. 17, which conceptually illustrates an exploded view of the control unit 1500. In this exploded view, the control unit 1500 is shown to include the control unit housing 1510, the display screen 1520, the front panel 1530, a main control board 1710

The main control board 1710 comprises a printed circuit board (PCB) and processor 1710. The PCB and processor 1710 may be a custom controller, a single board computer (SBC), an ESP32 micro-controller, or other computing device. As the main control board, the PCB and processor 1710 would also store runtime software for operation of the automatic HVAC filter change system. The runtime software may be stored as firmware onboard the PCB and processor 1710 or loaded by connection to an externally connected storage device, such as flash drive or other memory chip or buffer. Further details of electronic systems capable of configuring, storing, and running such runtime programs are described below, by reference to FIG. 19.

In addition, the PCB and processor 1710 board includes a plurality of attachment holes 1720 which enable the PCB and processor 1710 board to secured to a plurality of housing mount points 1730 along internal surface of the control unit housing 1510. Similarly, the display screen 1520 includes a plurality of attachment holes 1740 for threading screws to mount points (not shown) along the inside surface of the front panel 1530. When all components are assembled together, the PCB and processor 1710 are fully encapsulated within the control unit housing 1510, but the display screen 1520 is visible to users through the opening of the front panel 1530. In some embodiments, the display screen 1520 is a touchscreen that enables user interaction with the screen to configure, save, run, and otherwise interact with the automatic HVAC filter change system.

To use the automatic HVAC filter change system of the present disclosure, a person would install the automatic HVAC filter change system over an existing return grille that normally needs a filter to be changed manually. This would eliminate the need to go change the filter by hand. This frees up time, giving the user more time to do other things. It also allows the equipment being filtered to run more efficiently over a period of time with consistently filtered air. This is described next, by reference to FIG. 18.

Figure 18:
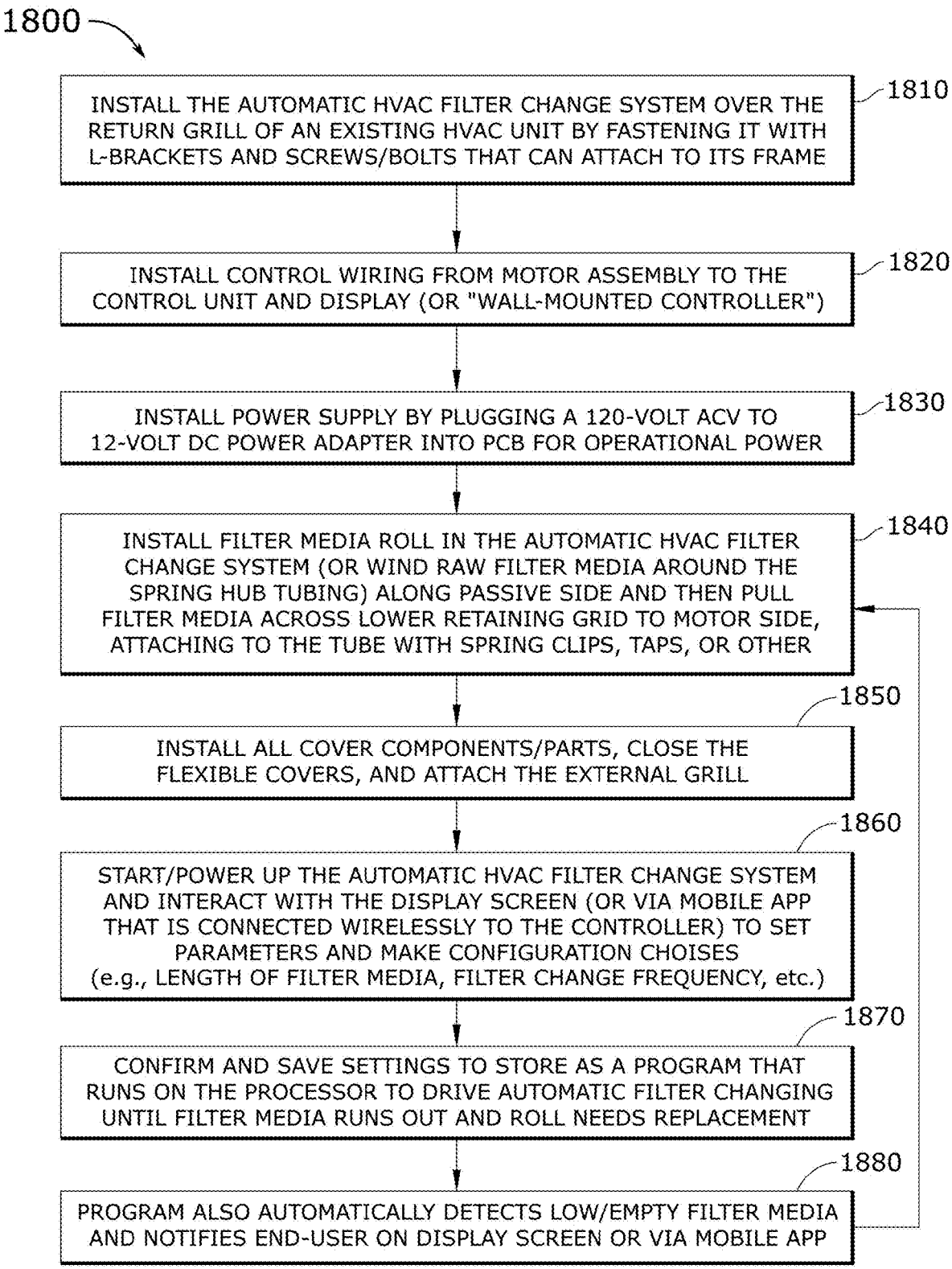
FIG. 18 conceptually illustrates a method for assembling, deploying, and automatically operating the automatic HVAC filter change system in some embodiments.

Specifically, FIG. 18 conceptually illustrates a method 1800 for assembling, deploying, and automatically operating the automatic HVAC filter change system. As shown in this figure, the method 1800 starts with installation (at 1810) of the automatic HVAC filter change system over a return grille of an existing HVAC unit, which would be done by fastening it with L-brackets and screws/bolts that can attach to its frame.

The method 1800 includes a next step for installing control wiring (at 1820) from the motor assembly to the wall-mounted controller, such as the control unit and display described above by reference to FIGS. 15-17. This is followed by a step for installing a power supply by plugging a 120-volt (ACV) to 12-volt (DC) power adapter (at 1830) into the PCB for operational power.

Now the method 1800 proceeds forward to step at which the filter media/filter media roller is installed (at 1840). Specifically, the filter media is installed either by winding raw filter media around the spring hub tubing or by installing a pre-wound filter media roller into the automatic HVAC filter change system. As described above, this would be installed along the passive side of the automatic HVAC filter change system (that is, the side which does not have the motor assembly). Then the filter media would be pulled out across the lower retaining grid over to the motor-side, and attached to the motor-side tubing with spring clips, taps, clamps, or other attachment items. After installing the filter media, the method 1800 has a step at which all the cover components and parts are installed, attached, bolted, secured, closed (for the covers), and the external grille is positioned and secured in place (at 1850). This completes the installation steps of the method 1800, which transitions into an operational phase, described over the next several steps (at 1860-1880).

Specifically, the method 1800 starts the operational phase by way of a user starting/powering up the automatic HVAC filter change system. Then the user interacts with the display screen of the control unit to set parameters and make configuration choices. Alternatively, the user may launch a mobile app that is configured to wirelessly connect to the control unit. Through the mobile app (hereinafter referred to as the "automatic HVAC filter change system mobile app"), the user may make selections and choices to similarly configure and set parameters and program operational settings. For example, inputting a length of filter media installed into the system (at 1840) or setting a filter change frequency parameter, etc.

Then the user confirms and saves the settings, which at the next step of the method 1800 stores all the configuration settings and parameters as a program (at 1870) that provides automated runtime operation of the automatic HVAC filter change system. The program itself is run on the processor the PCB and processor 1710, described above by reference to FIG. 17, or any other computing device processing unit. When running on the processor, the program sends commands to the automatic HVAC filter change system to drive the automated filter changing until the filter media runs out and the roll needs to be replaced.

The program also automatically detects when the filter media is running low or is completely out (at 1880). In that case, the method 1800 provides a step at which the program notifies the end-user of the low/empty filter media. The notification itself may be visually output on the display screen, transmitted to the automatic HVAC filter change system mobile app, or both. When the end-user gets the notification, the appropriate replacement filter media can be installed (at 1840) with the ensuring steps following as noted above.

Many of the above-described features and applications are implemented as runtime software processes that are specified as a set of instructions recorded on a computer readable storage medium (also referred to as computer readable medium, machine readable medium, or non-transitory computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the terms "software," "runtime software," and "program" are meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 19:
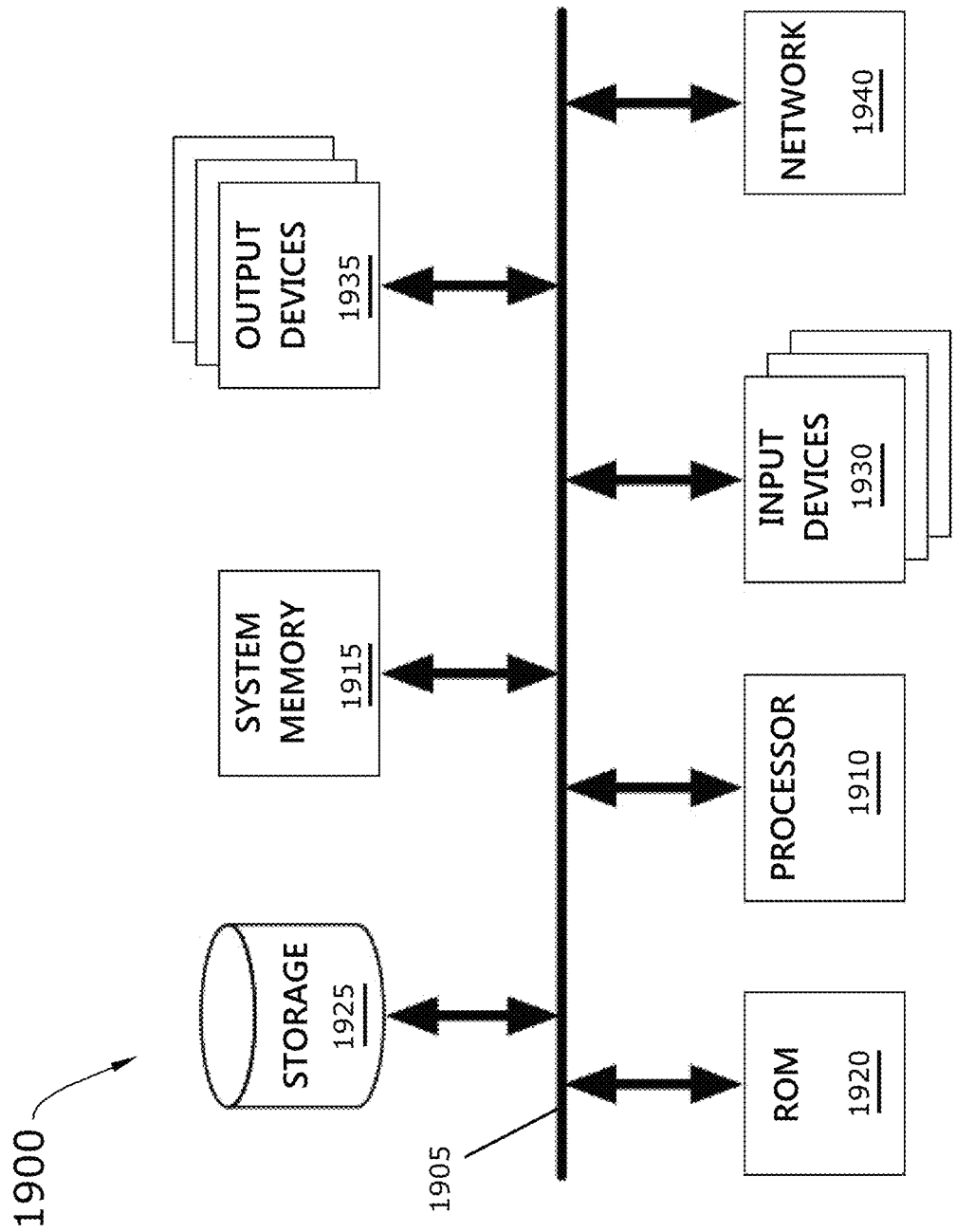
FIG. 19 conceptually illustrates an electronic system with which some embodiments of the invention are implemented.

By way of example, FIG. 19 conceptually illustrates an electronic system 1900 with which some embodiments of the invention are implemented. The electronic system 1900 may be a controller, a micro-controller, a computer, a laptop, a server, a single board computer (SBC), a network server, a mobile device, a smart phone, a personal digital assistant (PDA), a tablet computing device, or any other sort of electronic device. Such an electronic system includes various types of computer readable media and interfaces for various other types of computer readable media. Electronic system 1900 includes a bus 1905, processing unit(s) 1910, a system memory 1915, a read-only memory 1920, a permanent storage device 1925, input devices 1930, output devices 1935, and a network 1940.

The bus 1905 collectively represents all system, peripheral, and chipset buses that communicatively connect the numerous internal devices of the electronic system 1900. For instance, the bus 1905 communicatively connects the processing unit(s) 1910 with the read-only memory 1920, the system memory 1915, and the permanent storage device 1925. From these various memory units, the processing unit(s) 1910 retrieves instructions to execute and data to process in order to execute the processes of the invention. The processing unit(s) may be a single processor or a multi-core processor in different embodiments.

The read-only-memory (ROM) 1920 stores static data and instructions that are needed by the processing unit(s) 1910 and other modules of the electronic system 1900. The permanent storage device 1925, on the other hand, is a read-and-write memory device. This device is a non-volatile memory unit that stores instructions and data even when the electronic system 1900 is off. Some embodiments of the invention use a mass-storage device (such as a magnetic or optical disk and its corresponding disk drive) as the permanent storage device 1925. Other embodiments may use a removable storage device (such as a floppy disk or a flash drive) as the permanent storage device 1925.

Like the permanent storage device 1925, the system memory 1915 is a read-and-write memory device. However, unlike the permanent storage device 1925, the system memory 1915 is a volatile read-and-write memory, such as a random access memory (RAM, but also DRAM or SDRAM). The system memory 1915 stores some of the instructions and data that the processor needs at runtime. For instance, the end-user may import and install a program to automate the changing of the filter media over a particular schedule, based on one or more configuration settings or parameters selected by the user. The program may be automatically loaded when the end-user powers up the system, which would then load the program in the system memory 1915. In some embodiments, the invention's processes are stored in the system memory 1915, the permanent storage device 1925, and/or the read-only memory 1920. From these various memory units, the processing unit(s) 1910 retrieves instructions to execute and data to process in order to execute the processes of some embodiments.

The bus 1905 also connects to the input and output devices 1930 and 1935. The input devices enable the user to communicate information, such as configuration and parameter settings, and select options such as filter media length, schedule for changing filter media, etc., to the electronic system. The input devices 1930 include the display screen, mobile app (on mobile device), or externally connected computing device, as well as conventional input devices such as, without limitation, alphanumeric keyboards and pointing or cursor control devices. The output devices 1935 display operational data/information, notifications, and also output light via the LED ring and UV-LED strip or other light emitting devices for operational status of the system. The output devices 1935 include LEDs in an LED ring configuration and also along the frame for the UV-LED strip, as noted above, but also conventional any of various display devices for the display screen equipped as part of the control unit. Examples of the display screen include liquid crystal displays (LCD) and organic light emitting diode (OLED) displays. In some embodiments, the display screen itself is a touchscreen display that functions as both an input and output device. Additionally, the system may be configured to support other conventional output devices such as, without limitation, printers, audible alarms, flashing lights, etc.

Finally, as shown in FIG. 19, bus 1905 also couples electronic system 1900 to a network 1940 through a network adapter (not shown). In this manner, the computing device or electronic system 1900 can be a part of a network of computers (such as a local area network ("LAN"), a wide area network ("WAN"), or an Intranet), or a network of networks (such as the Internet). In some embodiments, this enables interaction through the mobile app to the control unit, but additional implies that any or all components of electronic system 1900 may be accessible by other devices as used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes and logic flows may be performed by one or more programmable processors and by sets of programmable logic circuitry. General and special purpose computing and storage devices can be interconnected through communication networks. Furthermore, some embodiments include electronic components, such as microprocessors, microcontrollers, integrated circuits (ICs) assembled with other ICs and processors on custom printed circuit boards (PCBs), as well as various storage and memory that store computer program instructions in a machine-readable or computer-readable medium (alternatively referred to as computer-readable storage media, machine-readable media, machine-readable storage media, or non-transitory computer readable media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the monetized user feedback system and platform can be embodied in other specific forms without departing from the spirit of the invention. For instance, FIG. 18 conceptually illustrates a method in which the specific operations and steps involves in the method may not be performed in the exact order shown and described. Specific operations or steps may not be performed in one continuous series of operations, and different specific operations/steps may be performed in different embodiments. Furthermore, the method described above in connection with FIG. 18 is implemented at least in part in a program (or runtime software). However, the steps of the method for the program could be implemented using several sub-step programs or program modules, or as part of a larger macro program, firmware, or other programmatic system. Thus, one of ordinary skill in the art would understand that the invention is not to be limited by the foregoing illustrative details, but rather is to be defined by the appended claims.

I claim:

1. An automatic HVAC filter change system comprising:
a frame;
a motor assembly and plate that connects to the frame in a first corner;
a plurality of auxiliary filter media roller end cap plates that connect to the frame in a plurality of other corners;
a grille;
a passive roller tube around which clean filter media is wound for automated changing;
a motor roller tube that rotates by operation of the motor assembly and pulls the clean filter media along the grille;
a plurality of passive clean side spring hub connected to the passive roller tube;
a single passive dirty side spring hub connected to a far end of the motor roller tube;
a drive spring hub connected to a near end of the motor roller tube and configured to rotate by rotational force generated by the motor assembly; and
a control unit and display configured to automate filter media changing.

2. The automatic HVAC filter change system of claim 1, wherein the frame comprises an aluminum frame.

3. The automatic HVAC filter change system of claim 2, wherein the aluminum frame comprises four connected 20×20 millimeter extruded aluminum frame components that connect together to form a square shape with four corners as a structural base component housing.

4. The automatic HVAC filter change system of claim 1, wherein the motor assembly comprises a motor, a primary gear, a secondary gear, a shaft spring, a pressure shaft, and a motor fixing bracket that secures the motor to a motor and drive hub support plate.

5. The automatic HVAC filter change system of claim 4, wherein the motor assembly further comprises an LED ring, a connector mounting bracket, and a PG connector.

6. The automatic HVAC filter change system of claim 4, wherein the motor comprises a NEMA motor.

7. The automatic HVAC filter change system of claim 4, wherein the secondary gear, the shaft spring, and the pressure shaft are connected in line and configured to translate power from the motor through the primary gear to the secondary gear into rotational power that drives the drive spring hub connected to the near end of the motor roller tube and pull the filter media over the grille to wind around the motor roller tube.

8. The automatic HVAC filter change system of claim 1, wherein the control unit comprises a printed circuit board (PCB) and processor.

9. The automatic HVAC filter change system of claim 8, wherein the control unit further comprises a display screen.

10. The automatic HVAC filter change system of claim 8, wherein the PCB and processor comprises an ESP32 microcontroller.

* * * * *